United States Patent
Verlut et al.

(10) Patent No.: US 8,639,397 B2
(45) Date of Patent: Jan. 28, 2014

(54) COMPUTATION-TIME-OPTIMIZED ROUTE PLANNING FOR AIRCRAFT

(75) Inventors: Gregoire Verlut, Munich (DE); Winfried Lohmiller, Freising (DE)

(73) Assignee: EADS Deutschland GmbH, Ottobrunn (DE)

( * ) Notice: Subject to any disclaimer, the term of this patent is extended or adjusted under 35 U.S.C. 154(b) by 1105 days.

(21) Appl. No.: 12/575,938

(22) Filed: Oct. 8, 2009

(65) Prior Publication Data

US 2010/0094485 A1    Apr. 15, 2010

(30) Foreign Application Priority Data

Oct. 10, 2008  (DE) .......................... 10 2008 050 951

(51) Int. Cl.
*G06F 7/00* (2006.01)

(52) U.S. Cl.
USPC ............................................................. 701/3

(58) Field of Classification Search
USPC .................................... 701/3, 5, 7, 30.2, 533
See application file for complete search history.

(56) References Cited

U.S. PATENT DOCUMENTS

| | | |
|---|---|---|
| 5,999,130 A | 12/1999 | Snow et al. |
| 6,085,147 A | 7/2000 | Myers |
| 6,477,515 B1 | 11/2002 | Boroujerdi et al. |
| 2006/0167601 A1* | 7/2006 | Henning et al. ................. 701/30 |

FOREIGN PATENT DOCUMENTS

| | | |
|---|---|---|
| DE | 10 2004 061 636 A1 | 7/2006 |
| EP | 0 843 179 A1 | 5/1998 |
| EP | 1 065 470 A1 | 1/2001 |

OTHER PUBLICATIONS

Ripple et al,. "Fast Graph—Search Algorithms for General Aviation Flight Trajectory Generation", Journal of Guidance, Control and Dynamics, vol. 28, No. 4, May 24, 2004, pp. 1-36.*
Rippel, E. et al., "Fast Graph—Search Algorithms for General Aviation Flight Trajectory Generation", Journal of Guidance, Control and Dynamics, vol. 28, No. 4, May 24, 2004, pp. 1-36.
Moehring, R. H. et al., "Partitioning Graphs to Speedup Dijkstra's Algorithm", ACM Journal of Experimental Algorithmics, vol. 11, Article No. 2.8, 2006, pp. 1-29.
Huang, Y. et al., "Optimizing Path Query Performance: Graph Clustering Strategies", Transportation Research Part C8, 2000, pp. 1-35.
German Office Action dated Jul. 6, 2009 (Five (5) pages).
German Office Action dated Sep. 14, 2009 (Five (5) pages.

* cited by examiner

*Primary Examiner* — Kim T Nguyen
(74) *Attorney, Agent, or Firm* — Crowell & Moring LLP

(57) ABSTRACT

A process and system for the planning a cost-minimized aircraft flight route between a starting point and end point takes into account costs associated with the flight route, no-fly zones and flight corridors, and aircraft limitations. A raster set is determined which comprises topographical points between the starting and end points, and costs associated with the respective raster points are determined. N nodes are determined for each raster point of at least one subset of the raster set, such nodes being associated with approach directions of the raster point by the aircraft. Possible take-off directions of the raster point are defined, taking into account the minimum turning radius of the aircraft, as a function of the approach direction. A cost-minimized flight route is determined by means of a shortest path algorithm, taking into account only the k most cost-effective nodes (k<N) for a raster point.

19 Claims, 8 Drawing Sheets

COMPUTATION-TIME-OPTIMIZED ROUTE PLANNING FOR AIRCRAFT

BACKGROUND AND SUMMARY OF THE INVENTION

This application claims the priority of German patent document no. 10 2008 050 951.5-54, filed Oct. 10, 2008, the disclosure of which is expressly incorporated by reference herein.

The invention relates to the planning of flight routes for aircraft. In particular, the invention relates to the determination of cost-minimized routes for low-flying military transport planes.

Modern airplanes frequently cannot be controlled without the aid of automatic and autonomous onboard systems. Every day, civil as well as military pilots use systems for carrying out task segments. These systems permit pilots to concentrate on critical tasks for which it is not yet feasible (or accepted) to replace human thought and action.

These systems are developed not only for the purpose of comfort but also for safety reasons. Flying in military planes is becoming increasingly complex: Pilots are under more and more pressure, and find themselves in stressful situations. Combat missions are complicated; moreover, the countermeasures of a possible enemy are more complex and more effective. Since weapons have also become more destructive, the consequences of a pilot's error are more critical than ever. It is therefore the goal of technical onboard support systems to spare the crew the implementation of repetitive tasks, so that pilots will be able to concentrate on the significant aspects of their missions. For example, the distance from an obstacle can be computed when the delay between two radar echoes is known. However, pilots cannot be expected to compute the distances. Nowadays, automatic onboard systems compute such a distance, and pilots decide how to utilize the information.

It may be of interest to military planes to fly low in threatened areas because the terrain protects the airplane from detection by a radar or SAM (Surface to Air Missile) station. A low level flight (LLF) is a stressful phase. In comparison to a flight at high altitude, the pilot will encounter more obstacles for which his evading maneuver possibilities are limited. In addition, since the visual range is more limited in the case of a low level flight than when flying at a greater altitude, obstacles will appear more suddenly.

For this phase of the flight, which requires high concentration, an auto-router is helpful for pilots. Even if a pilot would instinctively fly in valleys and not over peaks, it is difficult for him to decide which valley may be the best. Such a task of determining the best valley is a typical task that can be carried out by a computer, provided there exists a model of the aircraft and of the topographical environment and its risks which defines the criteria for a good route. An auto-router can support the pilot by suggesting the optimal route between given points.

Furthermore, the processes and systems for route planning described herein can also be used in so-called unmanned air vehicles (UAV). In such air vehicles, an onboard computer independently makes decisions concerning the flight control on the basis of the determined flight route. Furthermore, a use for unmanned ground vehicles (UGV) is also conceivable.

The planning of a low level flight constitutes a stressful phase for pilots. This applies to jet pilots but particularly also to pilots of transport planes. Among other things, this is connected with the dynamics of transport planes. A typical combat plane can fly up to 2,500 km/h, whereas C-130J a transport plane can fly only up to 645 km/h. At maximal speed, the C-130J transport plane therefore requires 3.8 times more time to traverse a certain region. It is not only the speed that is lower for transport planes than for jet planes, but also the climbing abilities. However, transport planes are not only less easy to maneuver (i.e., they have fewer possibilities at their disposal of evading a dangerous object more rapidly); they are also larger, which makes them easier to recognize or detect. Because of the larger surface, transport planes also to reflect radar signals better than jet planes. Furthermore, the propeller blades reflect the signal in a persistently unmistakable manner which, in addition, makes the airplane clearly identifiable by radar systems.

When flying within the scope of low level missions, transport planes often land on unprepared landing strips which, in addition, allow only short approach possibilities. Tasks of this type, combined with the increased radar detectability, make it necessary for the airplane to fly even lower than a jet plane. Consequently, the transport plane is increasingly exposed to mobile risks, such as machine guns and launchers. In addition, the airplane is visible longer because is flies more slowly in low level flight.

In the present patent application, a process and a system are suggested for determining a flight route between starting and end points for a predefined chart with several types of threats. The determined flight route is to be selected such that it minimizes the occurring risks and, if possible, takes into account a given flight duration. In this case, the various risks can be quantified as a component of costs. The costs of a route can be modeled, for example, by a heuristic function, taking into account, among others, the altitude of the terrain, the position and the type of the enemy's radar stations, the positions of no-fly zones and additional parameters which have an influence on risks of the route. The costs of a certain route may therefore represent the risks of the route. The higher the cost, the more dangerous the route. The risks may be known ahead of time and may, for example, be the result of a visibility calculation for the airplane. However, the risks may also originate from randomly spread-out threats.

This problem is one of optimization. No systems or processes capable of computing a route with an adequately high precision within a sufficiently brief period of time are known from the state of the art. This computation time period should be so short that a computation can take place onboard the aircraft. It is therefore an object of the present application to provide a process and a system which, while the runtimes are reduced, determine a flight route for an aircraft that is as cost-optimal as possible.

According to one aspect, the invention relates to a process for planning a cost-minimized flight route for aircraft between a starting point and an end point. The aircraft may, for example, be civil or military airplanes or helicopters. The invention can also be used for unmanned aircraft, such as UAVs, drones, cruise missiles or rockets. Furthermore, the invention can also be used for vehicles in general. Particularly for so-called unmanned ground vehicles (UGVs), limitations of the vehicle with respect to its track angle or its turning circle can be taken into account by means of the process according to the invention. The invention is particularly suitable for the planning of flight routes of low-flying military transport planes. The flight route is determined taking into account the costs associated with the flight route. In addition, limitations of the flight route which are the result of characteristics of the aircraft are to be taken into account.

In one step, the process according to the invention determines a raster set which comprises topographical points between the starting point and the end point. There are, for example, topographical maps and charts concerning the region over which the flight is to take place. These maps can be scanned or digitized at certain spots, (i.e., at certain area coordinates). The scanning values, which are also called raster points here, will then form the raster set. Each raster point, in addition to the area coordinates (x, y), may also contain information concerning the topographical height z of the earth's surface at this scanning point.

When defining the scanning rate, attention is preferably paid to the fact that the number of raster points in the raster set is adapted to the minimal turning radius of the aircraft. Since, despite the quantization of the topographical conditions, it should further be possible to realistically simulate the flight path of an aircraft, the rastering of the region should be sufficiently fine in order to be able to define transitions between raster points which can describe the minimal turning circle or turning radius of the aircraft. On the other hand, the rastering should also not be too fine because otherwise the computing time of a cost-minimized flight route would increase.

In addition, the process determines costs associated with the raster points of the raster set. These costs may, for example, be flying costs occurring when flying over the raster point. Particularly in the case of military applications, the costs may also quantify threat risks for the aircraft. Typically, the costs are dependent on the area coordinates (x, y) of the raster point as well as on its topographical height z. However, in addition, the costs may also depend on the flight altitude of the aircraft. This flight altitude corresponds at least to the topographical height of the raster point. For reasons of simplification, in the following, the topographical height of the raster point as well as the flight altitude of the aircraft are indicated by the variable z. The meaning of z is in each case provided by the context.

In a further step, the process determines N nodes for each raster point of at least a subset of the raster set. The N nodes are associated with approach directions of the raster point by the aircraft. Furthermore, as a function of the approach direction, possible take-off directions of the raster point are defined. Finally, the possible take-off directions are defined while taking into account the turning radius of the aircraft. In other words, N nodes can be assigned to a raster point, which in each case correspond to an approach direction of the raster point. In the following, these nodes are also called direction nodes which may in each case represent, for example, an approach direction of the raster point. For defining possible approach directions, a complete angle of 360 degrees is divided into N subangles, each of the N subangles corresponding to an approach direction. Preferably, but not necessarily, the division into N subangles takes place in a uniform manner.

As mentioned above, possible take-off directions may be assigned to an approach direction. By means of such an assignment, it becomes possible to take into account the limitations of an aircraft with respect to its horizontal turning circle. In an embodiment, N direction nodes are assigned to a raster point N, which direction nodes each correspond to an approach direction. For each of these approach directions, M possible take-off directions can then be defined which correspond, for example, to a straight-line continued flight, a right turn or a left turn.

The approach directions and the take-off directions typically define transitions between raster points and/or their associated direction nodes. Expressed in terms of graph theory, these transitions may be understood as edges of a graph. In this case, it is not absolutely necessary for a transition from a raster point to take place only to directly adjacent raster points. Within the scope of a transition there may also be a "flying over" raster points.

Finally, the process according to the invention determines the cost-minimized flight route between the starting point and the end point by means of a shortest path algorithm. In this case, only the k most cost-effective nodes are taken into account for a raster point, k being smaller than N. The shortest path algorithms may be standard algorithms, such as the Dijkstra algorithm, A* algorithm and/or the Bellmann-Ford algorithm.

According to an aspect of the invention, these algorithms are modified such that they do not take into account all possible nodes of the graph but only the k most cost-effective nodes for each raster point. In other words, only the k most cost-effective approach directions are permitted in a raster point. All additional approach directions will then no longer be pursued in the shortest path algorithm. As a result, the runtime of the shortest path algorithm can be reduced. The acceleration factor is obtained from the ratio of N to k. On the other hand, under certain circumstances, the cost-optimal flight route between the starting point and the end point can theoretically be determined further.

In addition, it should be taken into account that the described process can be used not only for determining a flight route from a certain starting point to a certain end point. As a function of the selected shortest path algorithm, the shortest flight route can also be determined from a starting point to all possible end points of the raster set or even from all possible starting points to all possible end points.

As mentioned above, the costs associated with a raster point may take into account a threat risk to the aircraft. In this case, the line of sight starting from the raster point and/or the presence of surface-to-air missiles and/or the presence of radar stations may represent a threat risk. Particularly in connection with radar stations, it should be taken into account that interactions exist between the different threat risks with respect to one another and the topographical environment. Thus, although a radar station may be present, a low threat risk may exist at certain raster points because, at these raster points, the radar signal is shielded by a mountain or another obstacle. This information can frequently be determined ahead of time and therefore be combined in a cost matrix C(x, y, z).

Thus, for example, the presence of a launching station for surface-to-air missiles at a location (x, y) represents a threat in certain surroundings of this location. This threat could decrease, for example, with the distance from this location (x, y). On the other hand, the cost matrix may also depend on the flight altitude z of the aircraft. In particular, an aircraft can also be detected more easily by a radar station at a higher flight altitude. Finally, so-called "no-fly" zones can also be detected by means of the cost matrix C(x, y, z). These could be taken into account, for example, by the defining of (prohibitively) high cost values in the "no-fly" zones (x, y, c). In addition, so-called "must-fly" zones or flight corridors can also be taken into account in the cost matrix.

Furthermore, the flight comfort could also be taken into account in the costs. Thus, for example, changes of the flight path (i.e., therefore particularly horizontal and/or vertical changes of the flight path) could be assigned higher costs because they have a negative effect on comfort. For example, because of the banking of the aircraft, the flying of a horizontal turn will reduce the crew's comfort. This can be particularly significant during flights with injured persons.

According to an aspect of the invention, the costs may depend on the flight altitude of the aircraft. Costs are typically associated with the individual raster points. The costs of the transitions between two raster points can then be determined therefrom, for example, by integrating the cost function C(x, y, z) by way of the transition. When the costs depend on the flight altitude of the aircraft, flight altitude along the transition may also be included in the integral. In this case, the minimal flight altitude which in each case is possible at the topographical height of a raster point, could, for example, also be taken into account. Furthermore, the possible rate of vertical descent of the aircraft could also be taken into account.

As mentioned above, the possible take-off directions of a direction node preferably define a transition from a current raster point to a raster point that follows. This means that the take-off directions define a transition from a direction node of a current raster point to a direction node of a raster node that follows. In this case, there may be a "flying over" additional raster nodes in the case of the transition. The costs of the transition will then preferably depend on the costs of the raster points adjoining the transition and on the time in which the airplane flies through the transition. Summarizing, the nodes which are associated with the raster points, the possible transitions between these nodes and the costs of the transitions, can be understood to be nodes, edges and weights which define a weighted graph.

It should be noted that, in a preferred embodiment, only the geographic area coordinates of a raster point and its associated approach directions, but not the flight altitude of the aircraft, define nodes for determining the cost-minimized flight route by means of the shortest path algorithm. In other words, the flight altitude of the aircraft or the topographical height of the raster points is not taken into account as a separate dimension within the shortest path algorithm. On the contrary, these altitude components are preferably considered within the cost matrix C(x, y, z). The flight altitude and the topographical height therefore influence the cost-minimized flight route by way of the costs of the transitions.

In a preferred embodiment, three possible take-off directions are defined for each node: A straight-line take-off direction, a take-off direction extending to the left and a take-off direction extending to the right. In this case, the take-off directions extending to the left and the right define a certain change of direction relative to the approach direction, which can generally be described by an angle. This angle may amount, for example, to 22.5 degrees with respect to the straight-line take-off direction. Such an angle is obtained, for example, when a complete circle (360 degrees) is divided into N subangles equivalent to 16. In this case, N possible approach directions equivalent to 16 are also defined. For this constellation, a value of k=3 supplies satisfactory search results. Consequently, a reduction of the runtime by more than a factor of 5 is achieved, the search results furthermore being quasi-optimal. By means of such a runtime reduction, it becomes possible to newly compute flight routes in real time. This allows a pilot to continuously adapt his flight route to new conditions so as to reduce the risk of enemy fire.

The invention further comprises a system for determining a cost-minimized flight route for aircraft between a starting point and an end point, taking into account costs associated with the flight route and limitations of the flight route caused by the aircraft. The system comprises computing devices for determining the raster set which comprises possible topographical locations between the starting point and the end point. The system further comprises computing devices for determining costs associated with the raster points of the raster set, and computing devices for determining N nodes to each raster point of at least one subset of the raster set. The N nodes are associated with approach directions to the raster point by the aircraft. In addition, as a function of the approach direction, possible take-off directions of the raster point are defined, the possible take-off directions being defined while taking into account the turning radius of the aircraft. Finally, the system comprises computing devices for determining a cost-minimized flight route between a starting point and an end point by means of a shortest path algorithm, only the k most cost-effective nodes being taken into account for a raster point and k being smaller than N.

According to a further aspect, the invention comprises a flight control system for aircraft which comprises the above-described system. This may also be a mission preparation system which carries out the computation of suitable flight routes before a mission or at a ground station or in a control airplane. This may be particularly significant in connection with UAVs. In addition, the invention relates to an onboard computer of a manned or unmanned air vehicle, which carries out the described process. Such an onboard computer typically comprises a memory, in which the described process is stored, and a processor, which carries out the described process steps. Thus, it is conceivable that, based on the determined flight route, an automatic or manual intervention takes place into the control of the air vehicle. Particularly in the case of unmanned air vehicles, such as drones or missiles, new knowledge concerning threat risks could thus be taken into account close to real time in the flight control.

Another problem when determining an optimal flight route is taking into account maximum possible climb and descent rates of an aircraft. Thus, according to a further aspect, the invention relates to a process for planning a cost-minimized flight route between a starting point and an end point for aircraft in low level flight while taking into account costs as a function of the flight altitude and limitations of a climb rate or of the vertical turning radius caused by the aircraft. In a step, the process determines a node set between the starting point and the end point. In addition, the topographical height is determined for nodes of the node set. In a further step, costs are determined which are associated with the nodes of the node set and which depend on the flight altitude of the aircraft. Furthermore, a cost-minimized route section between the starting point and a current node is determined by means of a shortest path algorithm, in which case a minimally possible flight altitude—taking into account the flyable climb rates and vertical turning radii—which is caused by the terrain over which the flight takes place, is assumed at the nodes of the route section for determining the costs of the route section.

In a subsequent step, it is recognized that the aircraft cannot reach the topographical height of the current node starting from the flight altitude at the preceding node of the route section. In this case, corrected costs of the route section are determined. This takes place while taking into account the climb rate or the vertical turning radius of the aircraft and the minimally possible flight altitude to be reached at the current node. This process is continued while taking into account the corrected costs of the route section until the current node corresponds to the end point.

Also in this process, the statements can be used which were made above concerning the used terms. However, it should be noted that in this process nodes do not necessarily have to be direction nodes in the above-described sense. On the contrary, the described backward-directed correction of the costs of a route section can be applied to arbitrarily defined nodes and graphs.

In a preferred embodiment, the process further comprises the step of determining a raster set which comprises possible topographical points between the starting point and the end point. In addition, the process determines N nodes associated with a raster point of the raster set, the N nodes being associated with approach directions of the raster point by the aircraft. Further, as a function of the approach direction, possible take-off directions of the raster point are defined, the possible take-off directions being defined while taking into account the turning radius of the aircraft. In other words, in this case, the process concerning the backward-directed correction of the costs of a route section is applied to the above-explained model of the topographical region and of the possible flight paths of the aircraft.

In this case, when determining the most cost-effective route section also only the k most cost-effective nodes associated with a raster point are taken into account, k being smaller than N. As explained above, as a result, a reduction of the runtime of the used shortest path algorithm can be achieved. This is particularly advantageous because higher computing times which are the result of the backward-directed correction of the costs of a route section can thereby be compensated. When combined, the two processes further permit runtimes which are reduced in comparison to standard shortest path algorithms. On the other hand, because of the backward cost correction, the climb rate of an aircraft can also be taken into account when determining a flight route, which cannot be achieved by means of shortest path algorithms from the prior art. This improves the modeling of the costs.

As mentioned above, the costs can take into account a threat risk to the aircraft. Such a threat risk may be connected, for example, with the line of sight starting from the raster point or node point, the presence of surface-to-air missiles and/or the presence of radar stations. Naturally, other factors, such as fuel consumption, may also enter into the cost function.

In a preferred embodiment, a node is defined by the geographic area coordinates of a spot on the earth's surface. With respect to the search space of the shortest path algorithm, the nodes of the weighted graph will then be defined by the geographic area coordinates of a node. In contrast, the flight altitude of the aircraft would not be entered into the definition of the nodes of the weighted graph. The shortest path algorithms may, for example, be the Dijkstra algorithm, the A* algorithm and/or the Bellmann-Ford algorithm. The latter algorithms are known to those skilled in the art.

According to a further aspect of the invention, the corrected costs of the route section can be determined by the following process steps. First, corrected minimally possible flight altitudes of the aircraft are determined at preceding nodes while taking into account the climb rate of the aircraft and the minimally possible flight altitude to be reached at the current node. Then the costs associated with the preceding nodes are determined while taking into account the corrected minimally possible flight altitudes of the aircraft. In other words, it is determined at which altitude the aircraft would have flown at preceding nodes had the pilot known that he had to have reached a certain flight altitude at the current node in order to overcome the later appearing obstacle. These newly determined flight altitudes will then lead to corrected costs C(z) at these node points.

On the basis of these corrected costs, the corrected costs of the route section to the current node will then be computed. When a constant climb rate is assumed, the minimally possible flight altitude at a node will then be obtained from the minimally possible flight altitude at the node that follows, minus the product from the climb rate and the geometric distance of the two nodes.

In connection with the determination of the corrected costs of a route section, reference is made to the above statements concerning the determination of transition costs. The costs of the transitions between node points can be determined from the integral of the cost function C(x, y, z) "flown over" by a transition. For determining the corrected costs of a route section, the respective costs of the transitions between the sequence of node points can then be added up.

According to a further aspect, the invention relates to a system for determining a cost-minimized flight route between a starting point and an end point for aircraft in low-level flight while taking into account costs dependent on the flight altitude and limitations of a climb rate caused by the aircraft. The system comprises devices for determining a node set between the starting point and the end point and devices for determining the topographical height of the nodes of the node set. In addition, the system comprises devices for determining costs associated with the nodes of the node set, which costs depend on the flight altitude of the aircraft.

The system further comprises devices for determining a cost-minimized route section between the starting point and a current node by means of a shortest path algorithm, a minimally possible flight altitude being assumed at the nodes of the route section for determining the costs of the route section. The system further comprises devices for recognizing that the aircraft cannot reach the topographical height of the current node starting from the flight altitude at the preceding node of the route section. For this case, the system comprises devices for determining corrected costs of the route section while taking into account the climb rate or the vertical turning radius of the aircraft and the minimally possible flight altitude to be reached at the current node.

The invention further relates to a flight control system for aircraft which comprises the just described system. In addition, the invention relates to an onboard computer of a manned or unmanned air vehicle which implements the above-explained process with respect to the backward-directed correction of the costs of a route section.

Other objects, advantages and novel features of the present invention will become apparent from the following detailed description of the invention when considered in conjunction with the accompanying drawings.

DETAILED DESCRIPTION OF THE DRAWINGS

First, a model of the flight behavior of an aircraft is to be established in the following. Important parameters of an aircraft for the route planning are the speed of the aircraft, its possible climb and descent angles and its minimal turning radius. The climb and descent angle as well as the minimal turning radius in this case typically depend on the flying speed of the aircraft.

The flying speed of the aircraft, in turn, depends on different goals which the pilot may pursue. Conceivable goals may consist of a minimum fuel consumption to be able to cover flight routes that are as long as possible, or a speed that is as high as possible in order to, for example, lower the risk of being shot down by enemy missiles. In the case of military planes, the different time-optimized flying speeds normally are in a relatively close mutual range so that a constant flying speed can frequently be assumed in a first approximation. A constant minimal turning radius as well as constant climb and descent angles or climb and descent rates can therefore also be assumed. However, it should be noted that the processes and systems described here can also be used in the case of variable aircraft dynamics. This means that it is definitely possible to determine a cost-optimized flight route even if the turning radius and/or the climb or descent angle of the aircraft vary along the flight route.

The turning radius influences the possibilities of the airplane for laterally varying its flight path. The climb and descent rates describe the possibilities of the aircraft to adapt its altitude to the local conditions. In the present patent application, particularly the turning radius of the aircraft plays a role because it limits the direction changes of the aircraft at every point. It is therefore not conceivable that an aircraft, particularly a transport plane, would freely change its flight direction. For changing the flight direction, routes are required that can be illustrated by a circle whose radius is the turning radius.

Figure 1:
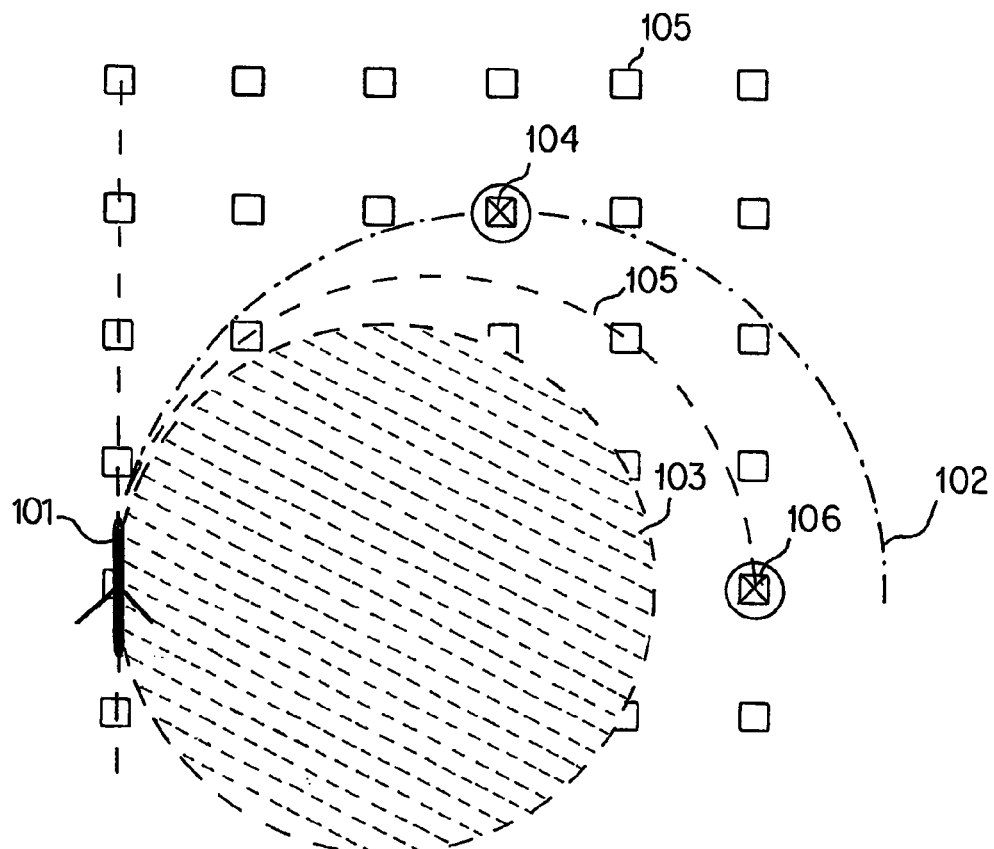
FIG. 1 is a view of the minimal turning radius of an aircraft.

FIG. 1 illustrates the possible changes of the flight direction. The aircraft 101 is flying over a terrain illustrated by a set of raster points 105. The set of raster points 105 is a quantization of the continuous terrain information. It can be determined, for example, by way of a scanning of the continuous terrain information at certain predefined points. In general, the raster point may be defined by the geographic area coordinates of the terrain point on the earth's surface. In addition, the raster point may also comprise the topographical height information of the terrain point on the earth's surface.

When the airplane 101 wants to turn or fly a turn, it can only do so within the scope of the minimal turning circle 103 which is defined by the minimal turning radius of the aircraft 101. Naturally, larger turning circles 102, 107 are also conceivable. In order to take into account the turning radius of the aircraft 101 when computing the flight route, the turning radius (preferably the minimal turning radius) has to be modeled. For this purpose, it is necessary for the raster points to be arranged sufficiently finely in order to make it possible that the minimal turning circle 103 can also be described by a sequence of raster points. As illustrated in FIG. 1, that is not so in the case of the shown set of raster points 105. On the contrary, only turning circles 102 and 107 can be described by the raster set. Turning circle 102 extends through raster point 104, at which the airplane has made a 90 degree turn. Turning circle 107 extends through raster point 106, at which the aircraft, at which the airplane has made a turn of 180 degrees. In contrast, the minimal turning circle 103 intersects no raster points and can therefore also not be imaged by the terrain model illustrated as an example.

It is therefore expedient for the terrain model to be coordinated with the minimum turning radius of the aircraft. In general, it may be stated that a smaller turning radius requires a finer scanning of the continuous terrain information. However, this also has the disadvantage that a larger set of raster points increases the runtime of a route algorithm. Good results can be achieved, for example, when the rastering amounts to approximately $1/10$ to approximately $1/3$ of the minimum turning radius.

Figure 2:
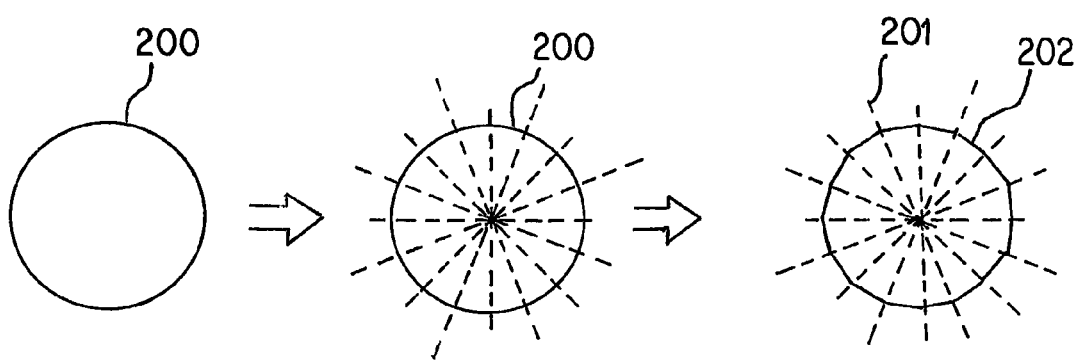
FIG. 2 is a view of a possible modeling of the turning circle of an aircraft.
Figure 3:
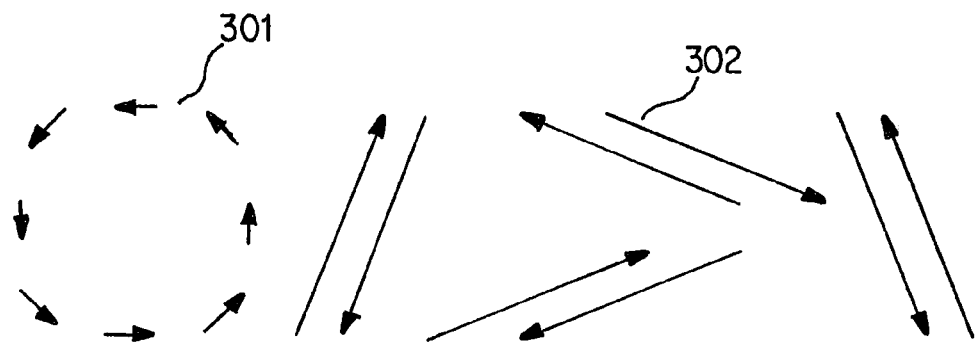
FIG. 3 is a view of possible transitions between raster points.
Figure 4:
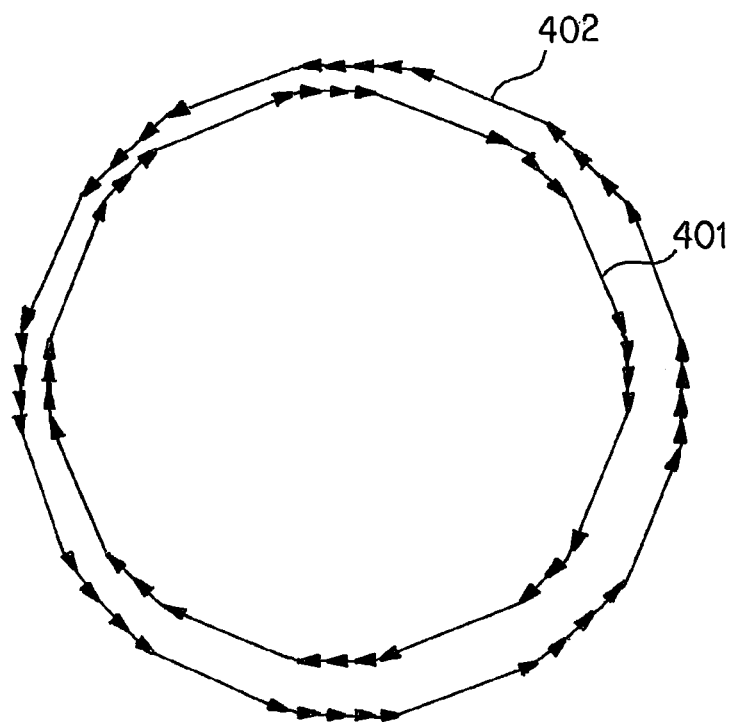
FIG. 4 shows the modeling of a turning circle of an aircraft by means of the transitions illustrated in FIG. 3.

In a rastered topological model, the right or left turn of an aircraft are illustrated by transitions, which are also called "edges" in graph theory, from one raster point to another raster point. For this purpose, a certain number of realistic transitions have to be defined. As illustrated in FIG. 2, the turning circle of an aircraft 200 can be broken down into a sequence of straight-line segments 202. In the illustrated example, 16 circle segments are defined. These circle segments correspond to a division of the complete circle into 16 sub angles, which are formed by rays 201. These 16 sub angles correspond to an angle of 22.5 degrees; i.e., $1/16$ of 360 degrees. Thus, when a turning circle 200 is to be described by 16 transitions on the raster set, this can take place by 16 transitions which are each rotated by 22.5 degrees with respect to the preceding transition. FIG. 3 illustrates a possible set of 16 transitions 301 and 302. FIG. 4 shows how different turning circles can be described by means of the transitions illustrated in FIG. 3.

It should be noted that coarser or finer segmentations of a turning circle are also conceivable. Generally, a segmentation of the turning circle into N segments can be carried out. These N segments will then also define N possible transitions from one raster point to a next raster point. A transition does not necessarily take place to a directly adjacent raster point. Transitions which cross several raster points are definitely conceivable and meaningful. These transitions will then represent possible moving directions of the aircraft on the raster set. Furthermore, it should be noted that a segmentation of the turning circle does not necessarily have to be uniform but that a non-uniform segmentation would also be conceivable.

Figure 5:
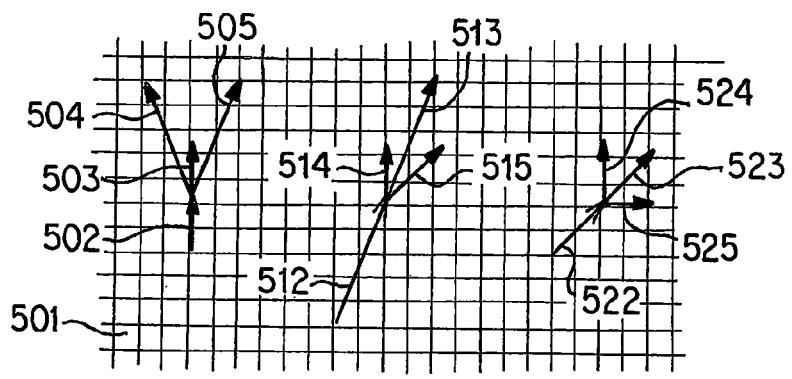
FIG. 5 is a view of embodiments of possible take-off directions with respect to certain approach directions of a raster point.

Since an aircraft, such as a transport plane, cannot turn arbitrarily, these N moving directions in a raster point generally cannot be combined with one another arbitrarily. When, for example, an airplane is flying into a raster point exactly from the southern direction, it cannot fly out of the raster point into an eastern direction because, although this transition is conceivable within the set of all possible transitions, it cannot be carried out in connection with the concrete approach direction. This is illustrated in FIG. 5. On raster 501, possible take-off directions 503, 504, 505; 513, 514, 515; and 523, 524, 525 respectively are illustrated for different approach directions 502, 512 and 522. The illustrated embodiment is based on the segmentation of the turning circle into 16 segments shown in the preceding figures.

FIG. 5 illustrates that only three take-off directions are conceivable for each approach direction, and these three take-off direction correspond to a straight-line continued flight, to a turn to the right by 22.5 degrees or to a turn to the left by 22.5 degrees. In this manner, the limited turning possibility of an aircraft can be modeled because it can be ensured in this fashion that the model does not fall below the minimal turning circle of the aircraft.

As illustrated in FIG. 5, three take-off directions 503, 504, 505 are conceivable for the approach direction 502 from the South. These take-off directions were taken from a possible pool of transitions, for example, the pool illustrated in FIG. 3. For an approach direction 512 from the South-Southwest, three other possible take-off directions 513, 514, 515 are taken from the pool of transitions. They again permit a straight-ahead flight 513, a left turn by 22.5 degrees 514 or a right turn by 22.5 degrees 515. Finally, FIG. 5 shows three possible take-off direction 523, 524, 525, which were also taken from the joint pool of transitions, for a take-off direction 522 from the Southwest.

In this manner, the flight path of an aircraft on the raster set is illustrated by a sequence of transitions from a pool of N transitions. From the N possible transitions, different approach directions are obtained for each raster point N. However, for each of these approach directions, only a set M of take-off directions are obtained on the basis of the limited turning possibilities of the aircraft, generally M being smaller than N. In the embodiment illustrated in FIG. 5, M is equal to 3.

So far, the horizontal turning possibilities of an aircraft have been modeled on a topographical raster set. Furthermore, an aircraft also has horizontal control possibilities in order to take into account changes of the topographical height during the flight. This horizontal control possibility is particularly significant during low-level flying maneuvers because the aircraft must continuously react to topographical changes of altitude.

Aircraft, such as transport planes, generally have two possibilities to gain altitude. When the speed of the aircraft is maintained, a so-called static climb takes place. However, if additionally the kinetic energy of the aircraft is converted to potential energy, a so-called dynamic climb takes place which permits a steeper climb rate but simultaneously also throttles the speed of the aircraft. The dynamic climb is generally used only in front of a steep obstacle, such as a mountain peak, in order to fly briefly over these obstacles and subsequently change back into a (dynamic or static) descent.

Figure 6:
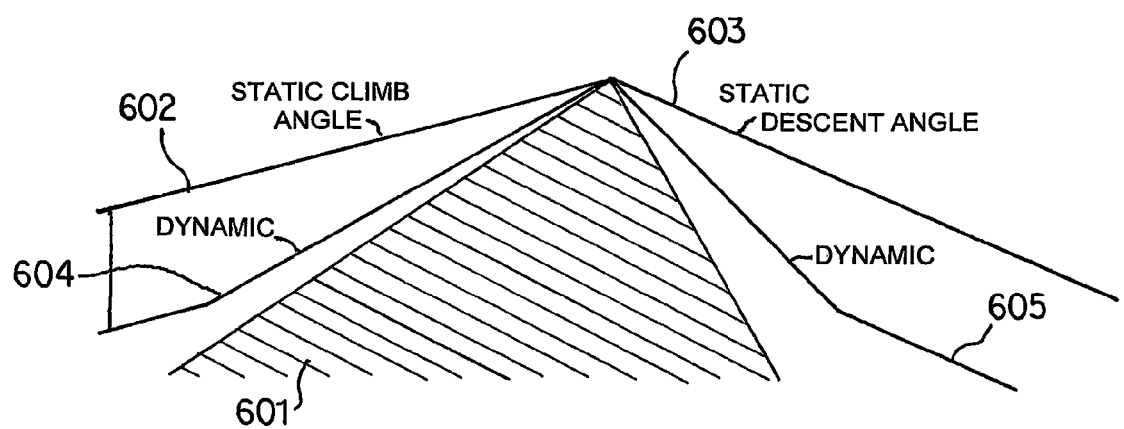
FIG. 6 is a view of different climb and descent scenarios of an aircraft.

It can generally be stated that the use of static climbs and descents results in higher flight altitudes than the use of dynamic climbs. This is also visible in FIG. 6, where a static approach 602 and a dynamic approach 604 respectively of an obstacle 601 are illustrated. In addition, a static descent 603 and a dynamic descent 605 are also shown. It is shown that typically lower climb and descent rates can be achieved by a static flying mode than by a dynamic flying mode.

In optimization processes, dynamic as well as static climb and descent rates of an aircraft can be taken into account. One possibility is, for example, the computation of routes, particularly the computation of the costs of the routes, by means of static climb and descent rates. These costs can then be corrected in a second step when a dynamic flying mode appears possible and meaningful. In the following, a climb and descent rate of the aircraft will be discussed in general. This climb and descent rate may represent a static as well as a dynamic climb and descent rate.

Furthermore, it should be taken into account that, when the flying mode is changed, (i.e., when a climb is initiated, or when a descent is initiated), delays may occur which are known in the English language as "pull arc" for the initiation of the climb, and "push arc" for the initiation of the descent. These delays can also be taken into account in the case of the climb or descent rate of an aircraft.

In the following, a possible modeling of the risks and of the costs respectively of a flight route will be described. In general, a cost function may be assigned to each raster point of a raster set. These costs may comprise a plurality of aspects. On the one hand, flight costs, such as gasoline costs, can be assigned to each raster point, which flight costs occur when the aircraft is flying through the region associated with the raster point. These flight costs may, among other things, depend on the altitude. However, with respect to low-level flying through enemy terrain, the costs may also represent risks or threats. Thus, for example, altitudes, such as mountains, may represent a threat because, when flying over such a mountain, an airplane can easily be seen from a long distance and thereby become a possible target for enemy fire. This is significant, particularly in the case of so-called unforeseeable risks, such as machine gun fire. This risk can be taken into account in that the extent of the line of sight starting from the raster point into the environment is taken into account in the costs of a raster point. It can generally be assumed that, in the case of a greater topographical height of the raster point, the costs with respect to the visibility of this raster point will also be higher.

Furthermore, additional threats are frequently known, such as radar systems or surface-to-air missiles, which are often combined with one another. These known threats can also be included as costs in the cost function of a raster point. In addition, so-called "no fly" zones can also be taken into account in that a particularly high cost value is assigned to them. On the whole, a cost matrix $C(x, y, z)$ is obtained which is a function of the area coordinates $(x, y)$ of a raster point and of the flight altitude of the aircraft.

Summarizing, the following models have been described so far. A topographical region is scanned by a set of raster points. The possible flight directions of an aircraft are described by a set of N transitions. In addition, a set of M take-off directions is defined for each of the N approach directions from the set of N transitions (the set of M take-off directions being a subset of the N transitions). The limited number of take-off directions for a given approach direction models the limited turning possibilities of an aircraft. In addition, the limited climb and descent capabilities of an aircraft can be modeled by the climb and descent rate of the aircraft. Finally, the various costs or risks of an aircraft during a flight from a starting point to an end point can be described by a cost matrix $C(x, y, z)$, which assigns an altitude-dependent cost function $C(z)$ to each raster point $(x, y)$.

In the following, processes and systems will be illustrated which, by means of the models shown above, determine a cost-minimized flight route of an aircraft from a starting point to an end point.

This can typically take place by using shortest path algorithms, such as the known Dijkstra, A* or Bellmann-Ford algorithms. In this case, the most cost-effective path between two nodes is determined by a network of nodes. These algorithms can be applied, for example, in such a manner to the present model that N nodes are assigned to each raster point, each of the N nodes corresponding to a certain approach direction. These N nodes will then each permit M transitions, thus edges, to further raster points or, more precisely, to nodes assigned to further raster points. In the above-described example, a network of 16 nodes per raster point is therefore obtained, each node having an incoming edge—the approach direction—and 3 outgoing edges—the take-off directions. Because of the precise modeling, the number of raster points typically is very high. As a result, the number of nodes in such a network is also very high, specifically N times the number of raster points. Since the above-mentioned shortest path algorithms have a runtime that is proportional to the number of nodes, this results in generally very high runtimes when computing the best routes. In the following, possibilities will be explained for reducing the runtime on the basis of the Dijkstra algorithm. These methods can be applied directly to other shortest path algorithms.

Table 1 lists the Dijkstra algorithm in pseudocode as an example. In this case, S and Q are two sets of nodes, Q representing the set of modes which have not yet been "relaxed", and S representing the set of nodes which have already been "relaxed". In this case, a node s is considered to be "relaxed" when its associated costs C[s] already correspond to the costs of the most cost-effective path leading through this node. V is the set of nodes v of the graph G through which a most-cost effective path is to be found. C[v] are the costs associated with a node v. The function "extract-Min{Q}" supplies the node u which, in the node set Q, has the currently lowest path costs, and extracts u from set Q. For a node u, there are a certain number of transitions or edges e=(u, v) to further nodes. These transitions e may also be encumbered with costs c(e). The algorithm checks whether a node v can be reached at lower cost by way of this path extending by way of node u. The thus processed path e is then also considered to be "relaxed". Finally, the variable "pred[v]" stores node u for each node v, which node u is part of a path by way of which v can be reached at the currently lowest cost.

TABLE 1

| 1 | function Dijkstra (G, s) |
|---|---|
| 2 | /* initialisation */ |
| 3 | for each vertex v in V[G] do |
| 4 | C[v] := infinity |
| 5 | C[s] := 0 |
| 6 | S := { } |
| 7 | Q := V |
| 8 | |
| 9 | /* search */ |
| 10 | while Q is not empty do |
| 11 | u := Extract-Min (Q) |
| 12 | S := S union {u} |
| 13 | /* relax the outgoing edges from u */ |
| 14 | for each edge e=(u, v) do |
| 15 | if C[v] > C[u] + c(e) then |
| 16 | C[v] := C[u] + c(e) |
| 17 | pred [v] := u |
| 18 | end function |

Table 2 finally shows how a most cost-effective path between two nodes s and v can be determined by means of the Dijkstra algorithm. Starting from the target node v, the predecessor nodes "pred[v]" on the most favorable path to the starting node s are successively determined.

TABLE 2

| 1 | function GetPath (G, v) |
|---|---|
| 2 | /* return the best path s-u computed with |
| 3 | * Dijkstra's algorithm |
| 4 | */ |
| 5 | p := [v] |
| 6 | w := v |
| 7 | while pred(w) != NULL |
| 8 | w := pred[w] |
| 9 | p := [w, p] |
| 10 | |
| 11 | return p |
| 12 | end function |

The runtime of the Dijkstra search can be decreased by reducing the number of nodes in the graph or network. Processes exist for achieving a reduction of the runtime as well as of the number of possible nodes. However, this typically requires a pre-processing, so that the gain with respect to the runtime cannot be immediately utilized. The reason is that a preliminary analysis takes place before the Dijkstra search. Such solutions can therefore not be used for a real-time computation of the flight route of an aircraft.

Figure 7:
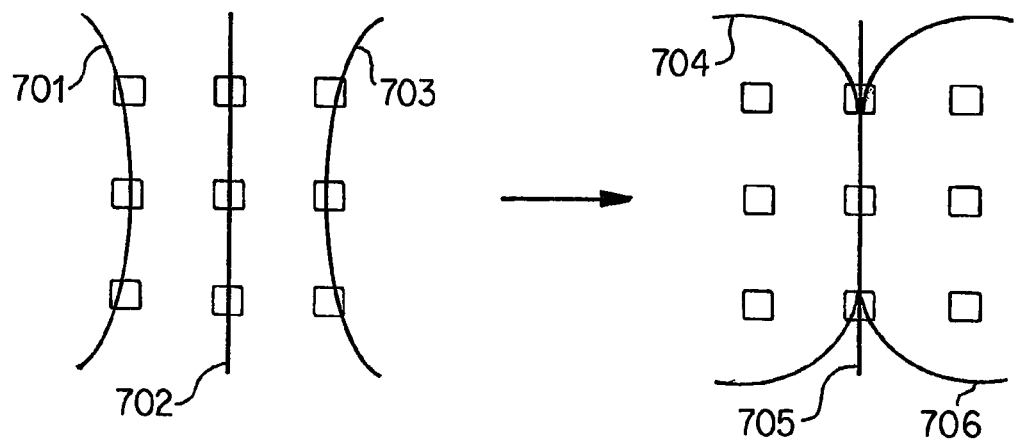
FIG. 7 is a view of conceivable combinations of parallel extending routes.

A process is therefore introduced which requires no preliminary analysis. The idea of this process is to reduce the number of nodes during the search by disqualifying nodes based on currently available information which is computed within the scope of the Dijkstra search. It should, for example, be assumed that, if several routes extend in parallel and are only a few nodes away from one another, their costs would not differ very much. It could therefore make sense to retain only one of these routes and cause the other routes to extend through the retained route. This is illustrated, for example, in FIG. 7 which shows three parallel extending routes 701, 702 and 703. These can be diverted without any significant rise in cost, and all three routes may therefore extend through a common route. These common routes are indicated by reference numbers 704, 705, 706.

However, it may be difficult to detect whether the geographical neighbors of raster points have parallel routes because the Dijkstra search progresses continuously through a graph. This means that routes grow simultaneously (and not successively) so that, when parallel routes can actually be detected, they have already been computed and it is too late to connect them with one another.

This principle of combining routes can nevertheless be applied to the flight directions in one raster point. On the one hand, many directions are required for modeling the airplane dynamics, i.e., particularly the limited turning circle; on the other hand, they may have a disadvantageous effect on the runtime of the Dijkstra algorithm. However, although they are necessary for taking into account the aircraft dynamics, they do not necessarily have to present for finding the optimal route in the graph. In other words, it is not necessary that a graph takes into account all N flight directions for finding the best route, as indicated in the following example. Let it be assumed that G is a graph and G' is a copy of G. For the raster points of the most favorable route from the starting point s to end point g in graph G, only the nodes which are part of the most favorable route are taken into account in graph G'. All other direction nodes of a raster point will be removed. In this special case, G' contains the same most favorable route as G but G' does not take into account all possible N flight directions; i.e., G' does not contain all possible N direction nodes for each raster point.

Figure 8:
FIG. 8 is a view of improbable approach directions at the starting point and at the end point of a flight route.

In other words, the number of flight directions stored in the graph for each raster point does not have to correspond to the number of flight directions required for the airplane model. There may therefore be fewer stored flight directions for a raster point than the flight directions N required for the aircraft modeling. In the above example containing G and G', the most favorable route was assumed to be known. This is generally not so. Nevertheless, certain flight directions may be removed for some raster points. For example, for positions in the proximity of the starting point s, nodes whose flight direction points to the source can be deactivated because it is highly probable that no efficient route extends through these nodes. This is illustrated by reference number 801 in FIG. 8. In the same manner, direction nodes 802 leading away from the end point g could be removed from the Dijkstra search algorithm.

Furthermore, the Dijkstra search determines the best flight direction for each raster point; i.e., for each raster point, costs are determined for the N associated direction nodes. The best flight direction for each raster point is defined as the direction with the lowest costs. When the aircraft has no further limitation, for example, with respect to its arrival time in the end point g, it will arrive at the end point by means of the best flight direction. In other words, at the end point, the associated node is selected which has the lowest cumulative costs. The n-th best flight direction is defined in a similar fashion. The n-th best flight direction of a raster point is known when this raster point was "relaxed" the n-th time in the Dijkstra search. In other words, the n-th best flight direction of a raster point is the flight direction which is associated with the direction node of the raster point which was activated as the n-th node of this raster point, i.e., has identified the minimal costs of all nodes available in the graph.

The n-th best route of a raster point will then correspond to the route which arrives at this raster point by means of the n-th best direction. In a similar manner, the k-th best node of a raster point corresponds to the node of the k-th best flight direction.

During the Dijkstra search, certain nodes are selected by using some of these n-th best characteristics. There are various manners of filtering out certain flight directions within the scope of the Dijkstra search. In this case, the efficiency of the direction filtering has to be analyzed in different scenarios. However, it should be ensured in every case that the additional runtime required for the use of a direction filter remains lower than the gain of runtime which is achieved thereby during the Dijkstra search. Several filters are illustrated here for which the additional runtime is negligible.

Figure 9:
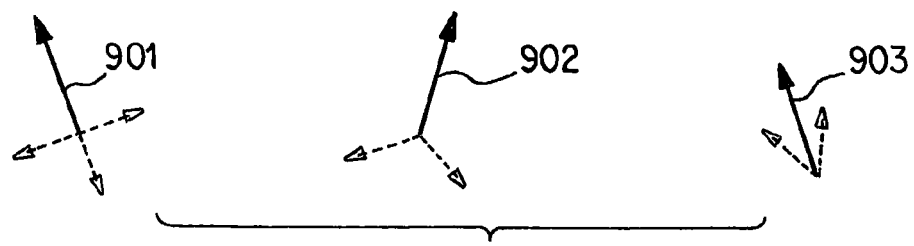
FIG. 9 is a view of embodiments of fixed and adjacent fixed direction patterns.

Based on the knowledge of the best flight direction, a fixed direction pattern can be used. This pattern could be a regular fixed pattern; for example, that only k of the N theoretically possible approach directions are stored in each raster point. If, for example, only 4 fixed approach directions were permitted in the above-illustrated example of 16 possible approach directions, the stored approach directions in each raster point would always be mutually orthogonal. Another possibility would consist of using an adjacent fixed pattern. This pattern could, for example, consist of permitting, in addition to a best flight direction, also 2k additional next directions on the left and the right thereof. For k=1, three possible approach directions would then be obtained for each raster point. The concept of an adjacent fixed pattern corresponds to the intuition that the first n best routes for a raster point arrive approximately from the same flight direction. Possible direction patterns are illustrated in FIG. 9. In this case, reference number 901 shows a fixed direction pattern with 4 predefined directions, reference number 902 shows a fixed direction pattern with 3 predefined directions, and reference number 903 shows an adjacent fixed direction pattern with 3 adjacent directions.

These patterns could be applied in the Dijkstra search to every raster point if one of the nodes associated with the raster point were identified as a node with the lowest cumulative costs. In this case, an additional data structure would possibly be required in the Dijkstra algorithm in order to store raster points to which no direction pattern had been applied so far. In order to avoid remodeling of the Dijkstra algorithm and in order to save additional storage requirements, the direction pattern could also be applied to each node v of the Dijkstra search if v were returned as the node with the lowest cumulative costs. However, for ensuring that the direction pattern is applied only once to each raster point, it should be checked whether v is the most favorable node of the raster point. If not, this means that the direction pattern had already been applied to this raster point; thus, a more favorable node had already been determined.

Table 3 illustrates an algorithm in pseudocode for taking into account a pattern. In this case, p is a raster point and v, w are possible direction nodes which are associated with the raster point p. The set {p\pattern} represents the set of all direction nodes of a raster point p which are not part of the fixed direction pattern. In addition, Q is the set of all nodes in the graph.

TABLE 3

| 1 | function applyFixedPattern (p, v, Q, PATTERN) |
| 2 | for each vertex w in p |
| 3 | if C(w) < C(v) |
| 4 | /* it exists a cheaper vertex. |
| 5 | * the pattern has already been applied |
| 6 | */ |
| 7 | return |
| 8 | |
| 9 | for each vertex w in {p \ PATTERN} |
| 10 | remove w from Q |
| 11 | end function |

It is found that, although fixed direction patterns can reduce the runtime of the Dijkstra search, they also supply suboptimal flight routes. In addition, as a result of a fixed direction pattern, numerous nodes are retained which in fact are not considered when searching for a cost-optimal flight route. This is a result of the fact that approach directions which extend orthogonal or opposite to the best approach direction are rather improbable.

Figure 10:
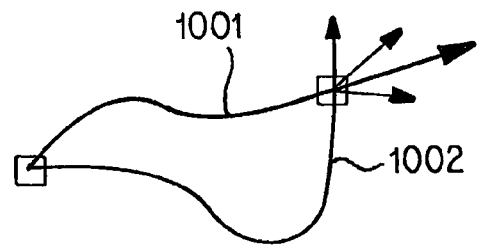
FIG. 10 is a view of mutually intersecting routes.

Instead of a regular fixed pattern, an adjacent fixed pattern can be used so that the graph is not filled with useless unreachable nodes. For most scenarios, the pattern with k=1 presents itself which, in addition to the best approach direction, in each case, permits its left and right neighbors. As a result, routes that are perhaps improbable but definitely possible are excluded from the start. As illustrated in FIG. 10, in the case of a best route 1001, intersecting routes 1002 are excluded by an adjacent fixed direction pattern. Because of the increase of k, such routes could again made be possible but, as a result, the number of possible nodes in the graph are also increased which therefore, in turn, impairs the runtime of the Dijkstra search.

As illustrated above, fixed direction patterns do not seem to be sufficiently flexible in order to adapt themselves to the local conditions of the graph. It is therefore suggested to use adaptive direction patterns. An efficient adaptive pattern is, for example, a pattern which takes the first k best approach directions into account for a raste r point, but excludes all further approach directions. This means that, for each raster point, all further nodes are deactivated if k more cost-effective nodes of the raster point had already been identified. All further nodes of this raster point can then be deactivated in the total set of all nodes Q of the graph or be removed from Q. Similarly to what was shown in connection with the fixed pattern, it may be advantageous to apply the filter corresponding to the direction pattern to all nodes of a raster point and to count how many nodes of the raster point have lower cumulative costs.

If fewer than k−1 nodes have lower costs, additional nodes may be taken into account. If precisely k−1 nodes already have lower costs, all further costs will be removed from Q. The case that already more than k−1 nodes have lower costs cannot occur because, as a result of the removal of remaining nodes from Q, it is ensured that these nodes are not further taken into account in the Dijkstra search. The corresponding filter function is illustrated as a pseudocode in Table 4. In this case, k is the number of the permitted best nodes.

TABLE 4

```
1   function applyKBestPattern (p, v, Q, k)
2       integer count := 1
3       for each vertex w in p
4           if C(w) < C(v)
5               /* count the # of cheaper vertices */
6               count++
7
8       if count < k
9           /* v is not the k-th best vertices */
10          return
11      else if count > k
12          /* this case should never happen !
13           * excepted the code contains errors
14           */
15      else
16          /* k vertices have been updated
17           * remove the others
18           */
19          for each vertex w in p with C(w) >C(v)
20              remove w from Q
21  end function
```

In order to save storage space, the structure of the graph could be changed. Instead of providing storage space for N nodes for each raster point, only storage space for the k considered best nodes could be reserved. The algorithm would then have to be adapted such that, before the updating of the costs and of the predecessor of a node v, it is checked whether, with these new values, v belongs to the k best nodes of the raster point p. This modification is implemented by the algorithm illustrated in Table 5. The algorithm also updates the corresponding raster point p if v is in fact one of the k best nodes of p. The updating takes place by rearranging the k−1 bests nodes which have already been identified.

TABLE 5

```
1   function verifyKBest {p, v, Q, k}
2       integer count := 1
3
4       while count < k + 1 && C(p[count]) > C(v)
5           count++
6
7       /* count contains now the order of v */
8
9       if count <= k
10          /* v belongs to the k best vertices
11           * p needs to be updated:
12           *        -the last vertex is erased
13           *        -all vertices more expensive that v
14           *         are shifted to worse indexes
15           *        -v is stored at its place
16           */
17          remove p[k] from Q
18          for i = count to k-1 by 1
19              p[i+1] := p[i]
20          p [count] := v
21          Q = Q + {v}
22      else
23          /* v is not in the k best vertices
24           * nothing has to be done
25           */
26  end function
```

One difference between the algorithms from Table 4 and 5 is the number of required comparisons in order to determine whether the node v is part of the k best nodes of a raster point p. In the algorithm from Table 4, N comparisons are necessary for each of the k best nodes of raster point p when this node is "relaxed". k·N comparisons are therefore required per raster point. In the algorithm from Table 5, up to k comparisons are necessary each time a node of raster point p is updated. Since a node can be updated up to three times, because it is the neighbor of up to three other nodes, the least favorable number of comparisons is 3·k·N per raster point. However, it could be illustrated experimentally that on average only approximately 3·k comparisons are necessary. The difference between the two algorithms is based on the fact that, in the algorithm from Table 4, the characteristic of a node with respect to its belonging to the k best nodes of a raster point takes place before the "relaxation" of the node, whereas this takes place before the updating of this node in the algorithm from Table 5.

In comparison to other processes, the adaptive direction pattern is controlled only by a numerical parameter. A flight route, which is computed by means of the illustrated "k-best node" process, consists of nodes which each are "k-best nodes" themselves. Each "k-best node" itself can be reached only by way of other "k-best nodes". Thus, for a given raster point, the i best node which is found by means of a standard Dijkstra algorithm does not necessarily correspond to the i best node which is found by means of the "k best node" process illustrated here. However, the nodes correspond to one another when the i best node which was found by means of a standard Dijkstra process in this graph itself can be reached only by way of "h-best nodes". Thus, it can be noted that, when the most cost-effective route, which was found by means of the standard Dijkstra algorithm, contains only "k-best nodes", the illustrated "k-best node" process also determines the most cost-effective route. It is therefore not impossible from the start that the illustrated "k-best node" process determines the cost-optimal flight route.

Furthermore, it should be noted that, in the "k-best node" process not N, as in the standard Dijkstra algorithm, but only k nodes are "relaxed" per raster point. A theoretical acceleration factor of N/k relative to the Dijkstra search is therefore obtained. Because of the calls for the additional filter algorithm, i.e., for example, the algorithms from Table 4 or 5, in practice, this acceleration factor could be slightly lower.

Mathematically, the "k-best node" process may be considered to be an additional limitation of the possible approach directions of individual raster points on the searched flight routes. Although this may possibly result in slightly sub-optimal flight routes, it also results in a significant reduction of the runtime of the shortest path algorithm. The "k-best node" process has the advantage that the original graph, in which a search takes place for an optimal fight route, remains unchanged. A limitation of the graph takes place only progressively in that, at a local level, routes are dropped which cause excessive costs at a certain node.

The original optimization problem can be illustrated by the following formula:

$$\min \sum_{i=0}^{N} \text{cost}(\bar{x}_i)$$

under the conditions:

$$\bar{x}_{i+1} = f(\tilde{x}_i, u_{i+1})$$

$$z_{i+1} = g(\hat{x}_0, \ldots, \hat{x}_i, x_{i+1}, y_{i+1})$$

$$\theta_{i+1} = (\theta_i + u_{i+1})\%\Theta$$

$\tilde{x}_0$ is given as start date
$\bar{x}_N$ is given as goal state
$\forall j < N, u_{0, \ldots, j}$ is itself solution of the sub-problem with $\bar{x}_j$ as goal state
wherein $\bar{x} := \{x, y, \theta\}$, $\hat{x} := \{x, y, z\}$ and $\tilde{x} := \{x, y, \theta, z\}$.

Here, θ is the quantity of possible approach directions and, in this concrete case, N is the number of transitions required in order to arrive from a starting point (start state) to an end point (goal state). This N should not be confused with the number of direction nodes N. Furthermore, u represents a control input which defines the selected take-off direction for a certain approach direction.

The described "k-best node" process solves the same minimization problem but under changed conditions:

$$\bar{x}_{i+1} = f(\bar{x}_i, u_{i+1})$$

$$z_{i+1} = g(\hat{x}_0, \ldots, \hat{x}_i, x_{i+1}, y_{i+1})$$

$$\theta_{i+1} = (\theta_i + u_{i+1})\%\Theta$$

$\tilde{x}_0$ is given as start date
$\{x_N, y_N\}$ is given as goal state
$\forall j < N, \exists$ at most $k-1$ other solutions which are better than $u_{0, \ldots, j}$ for the sub-problem with $\{x_j, y_j\}$ as goal state Since the nodes are already filtered during the Dijkstra search, this leads to an immediate reduction of the runtime. No preliminary analysis is therefore required, as in the case of other run-time-optimized search processes. This is of special interest when there is a change in the flight scenario during the flight because new flight routes can thereby be determined immediately on the basis of current data.

It could be illustrated in experiments that, in the case of N equal to 16 possible approach directions, the selection of k equal to 3 best approach directions already supplied results which are relatively close to the optimal solution of the standard shortest path algorithms.

Summarizing, it can be noted that the illustrated "k-best nodes" process significantly reduces the runtime of the shortest path algorithms and further can determine almost optimal flight routes. This is particularly important for transport plane route planning, in which low-level flight sections frequently last between thirty and ninety minutes and the flight scenario changes in a regular fashion during the flight. This will then require a short-term new computation of the flight route, which is possible only when the runtime of the search algorithm is short. In addition, pilots would like to have the result of the route planning as quickly as possible so that they will have sufficient time for informing military air traffic control of the new flight plan or for updating further flight phases that are not low-level flight phases. In this context, the described process using the k-best nodes or using adaptive direction patterns in each raster point represents a suitable process for quickly determining an almost cost-optimal flight route.

In other words, the problem and the solution of the "k-best node" process can be illustrated as follows. Even when the complexity of the shortest path algorithms and specifically of the Dijkstra algorithm extends only proportionally to the number of nodes, the number of nodes in a graph must nevertheless be limited in order to achieve acceptable runtimes in the case of complex search problems.

As explained above, the aircraft dynamics require a fine rastering of the region and thus a fine resolution for the graph in order to take into account the limited turning radii of an aircraft. For a low-flying transport plane, for example, a lateral raster resolution of 400 m and a direction resolution of 22.5 degrees make sense. Otherwise, there would be the risk that the determined routes could not be flown by a real aircraft. A 22.5 degree resolution generates, for example, 16 direction nodes per raster point (x, y).

It seems probable that a large portion of the direction nodes is uninteresting for each raster point, because these direction nodes correspond to approach directions which represent unfavorable flight directions in the context of the raster point and on the path from the starting point to the end point. However, the goal also does not seem to be achievable by deleting these uninteresting directions beforehand because the directions which are in fact of interest are determined only in the course of the algorithm. On the other hand, because of the aircraft dynamics, the resolution of the graph should also not deteriorate.

The "k-best node" process permits an adaptive reduction of the nodes of the graph and thereby an acceleration of the search algorithm. The "k-best node" process limits the number of used directions or nodes but not the number of available directions and nodes. Initially, all 16 directions are present for a raster point, but if k directions, $1 <= k < 16$, have already been used, the 16−k remaining directions are deactivated, so that they are ignored by the Dijkstra algorithm. The selection of k defines the acceleration factor 16/k or generally N/k. It can be demonstrated experimentally that the "k-best node" process finds the same routes for many scenarios at $k >= 3$ as an optimal shortest path algorithm.

In the above-illustrated process for determining a flight route that is as optimal as possible from a starting point to an end point, the flight altitude of the aircraft can be taken into account within the cost matrix (x, y, z). In particular, in the case of each raster point, the actual flight altitude of the aircraft can be determined. The costs for the transition from one raster point to the next can then be determined from the costs C(x, y, z) of the raster points over which the flights took place.

Figure 11:
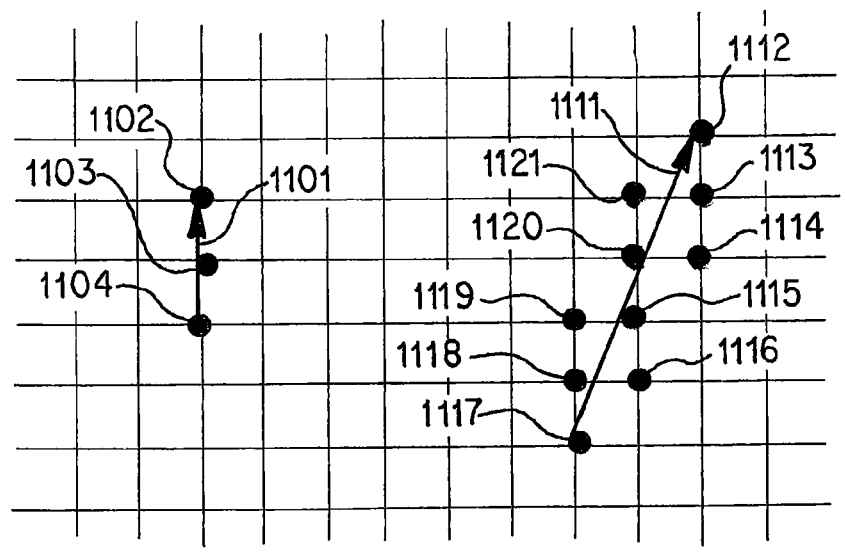
FIG. 11 is a view of embodiments of raster points over which a flight takes place within the scope of a transition.

This is illustrated as an example in FIG. 11 which shows two transitions 1101 and 1111 between two raster points. In the case of the straight-line transition 1101, the flight takes place over three raster points 1102, 1103, 1104. As a result, the total costs of this transition can be determined from the cost functions C(z) at these three raster points. These three cost functions could be supporting points for an interpolation. The flight altitude z of the aircraft could change on the path from raster point 1104 to raster point 1102. Intermediate flight altitudes could also be determined by interpolation. The total costs of the transition could then be obtained from the integral of the interpolated cost function taking into account the interpolated flight altitudes.

FIG. 11 further represents a diagonal transition 1111 from raster point 1117 to raster point 1112. Although, in the case of such diagonal transitions, it is possible that no flight takes place directly over any raster points, the transition takes place between pairs of raster points. In the illustrated example, these are pairs of raster points 1116, 1118 and 1115, 1119, and 1114, 1120 and 1113, 1121 respectively. The cost function C(z) at these raster point pairs and at raster points 1117 and 1112 can then be included in the computation of the transition costs. Here also, suitable interpolations are conceivable for determining the cost integral. These cost integrals are then associated with the respective transitions or edges and are included in the shortest path computation.

The correct accounting of the actual flight altitude of the aircraft presents a problem with respect to computing the route. One possibility would consist of assuming the topographic altitude of a raster point plus a minimal distance from the ground to be the flight altitude of the aircraft at any time. It could further be assumed in a simplified manner that the aircraft is always flying at the lowest possible altitude at any time. However, in this case, the physical limitations during a climb or descent of an aircraft would be neglected. It is therefore advantageous also to take into account the maximal descent rate of the aircraft. When an actual node point is clearly lower than the preceding node point on the flight route, it can be assumed that the aircraft is descending at a maximal descent rate and, at the actual node point, reaches a flight altitude which is the result of the following equation: (Flight altitude at the actual raster point=(flight altitude at the preceding node point)−(descent rate*distance of the two raster points). This flight altitude will naturally only be relevant when it is above the topographical height of the actual raster point, plus the minimum distance from the ground.

This process can be used in a similar manner when the current raster point is located higher than the preceding raster point. Then the climb rate of the aircraft is taken into account instead of the descent rate. However, it is problematic when the topographic altitude of the current raster point is above the thus determined flight altitude. This would mean that the aircraft is physically unable to climb from the altitude of the preceding raster point to the altitude of the current raster point. In order to be able nevertheless to continue with the determination of a flight route and assume costs for the route determination that are as close to reality as possible, in such cases, first the topographical height of the current raster point (plus a minimum distance from the ground) and not the flight altitude actually reachable by the airplane could be taken into account.

An improvement of the process can be achieved in that, in cases in which an aircraft cannot reach the required flight altitude for flying over a current raster point, a new computation or correction of the cumulative costs of the current raster point is initiated. This concept of a backward new computation of the cumulative costs at a raster point will be explained in detail by means of FIG. 12.

Figure 12:
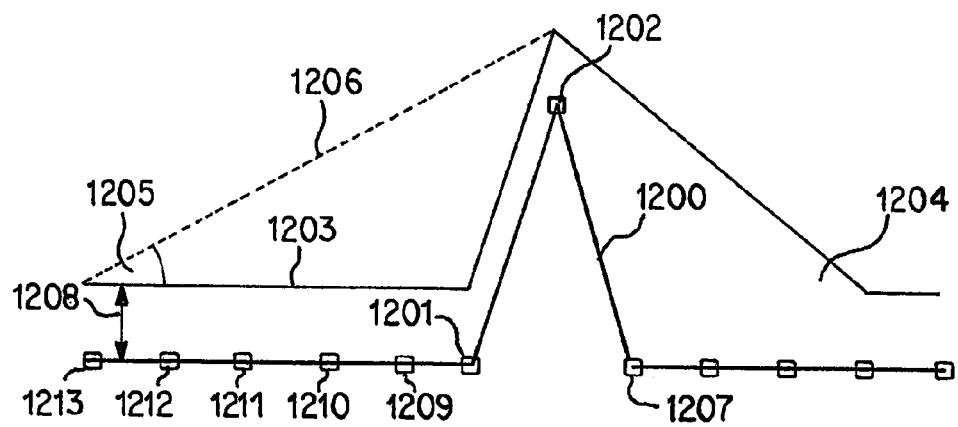
FIG. 12 is a view of the backward altitude correction in the case of altitude conflict situations.

FIG. 12 shows a sequence of raster points on a flight route 1200. Of the raster points over which a flight took place, reference number 1202 represents the current raster point; reference number 1201 represents the preceding raster point; and reference number 1207 represents the raster point that follows. In the above-described process, line 1203 would represent the flight altitude taken into account for the cost computation. This means that it would be assumed in a simplified manner that the aircraft would fly at any point in time at an altitude 1208 above the topographical height of the raster points of the flight route. When the topographical height drops off along the flight route 1200, the rate of descent or the descent angle 1204 of the aircraft can easily also be taken into account so that a deviation takes place there from the minimal altitude 1208 above the topographical height. This is visible particularly for raster point 1207, where the deviation between a constant altitude above the ground and the actual path of the descent is especially clear.

However, the situation in front of an obstacle is different because, until the obstacle is reached, the search algorithm has assumed a constant altitude above the ground and has taken the corresponding costs into account in the search. As illustrated in FIG. 12, the costs of the flight route computed in this manner are, however, not correct because the aircraft has a maximal climb rate or a climb angle 1205 and the rise in altitude from raster point 1201 to raster point 1202 on the flight path 1203 is therefore unrealistic. A realistic flight path, which takes into account the rate of climb or the climb angle 1205 of the aircraft, is illustrated by the flight path 1206. Since a real airplane will in reality fly this corrected flight path 1206, when a cost-optimized flight route is determined, the corrected flight path 1206, and therefore also the corrected costs C(z), should be taken into account, z representing the actual altitude of the aircraft.

This is not possible in shortest path algorithms from the prior art because the previous raster points, or the direction nodes associated with the respective raster points, had already been "relaxed" with the costs pertaining to the assumed lower flight altitude. These are not treated again in the shortest path algorithms. However, when an incompatibility situation is detected between the topographic altitude and the current flight altitude of the aircraft, it is possible to compute corrected costs of the current raster point 1202 or its associated direction node.

In addition, in the illustrated example, the corrected costs on the traveled flight route (i.e., in raster points 1201, 1209, 1210, 1211 and 1212) are determined taking into account the correct flight path 1206 or altitude. These corrected costs are then added to the cumulative costs in raster point 1213, where the assumed flight path 1203 deviates for the first time from the actual flight path 1206, and are stored as costs of the route section to raster point 1202 or its associated direction nodes. In the following, these corrected costs are taken into account for the further determination of the entire flight route.

By means of the illustrated "backward" correction process, it can be achieved that a correction of the route section costs takes place when an incompatibility situation occurs between the actual flight altitude and the topographical height. In an extreme case, such a correction may have the result that a previously cost-effective route section is not pursued because the corrected flight altitude has led to significantly higher costs. Generally, it can be achieved by means of the "backward" correction process that a shortest path algorithm is continued with corrected route costs, so that a cost-optimized flight route can be determined which corresponds more precisely to the realistic flight conditions. The "backward" correction process therefore makes it possible to take into account the vertical control possibilities, particularly the climb rate of the aircraft, when determining a cost-optimized flight route.

It should be noted that the "backward" process can be applied to arbitrary shortest path algorithms. Its use in connection with the above-described "k-best node" process, however, is particularly advantageous because, as a result of the runtime-optimized "k-best node" process, the increased computation capacity demands can be compensated again by the "backward" process.

It is further noted that different assumptions can be made in connection with the backward cost correction. On the one hand, it can be assumed that an aircraft climbs at a constant climb rate to the topographic altitude of the actual node or raster point. This is a valid assumption if the aircraft continues its climb also behind the actual node. On the other hand, it is definitely possible that the aircraft may terminate its climb behind the actual node and may possibly start a descent. In such cases, the above-mentioned "push arc" of the aircraft should be taken into account. The latter has the result that the aircraft prepares itself for a vertical direction change already before the actual node, and that therefore the aircraft has a greater flight altitude in front of the actual node than in the case of a constant climb.

Figure 13:
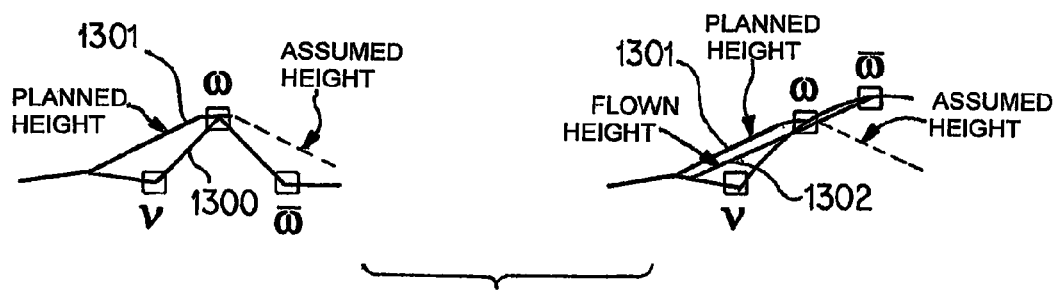
FIG. 13 is a view of the backward altitude correction by means of a "push arc" flight path.
Figure 14:
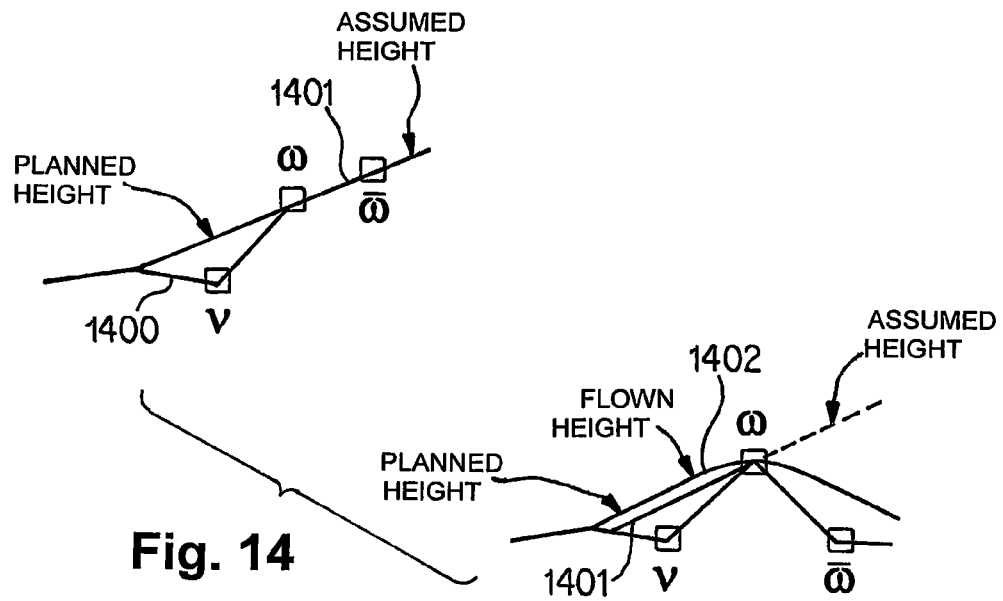
FIG. 14 is a view of the backward altitude correction by means of a flight path with a constant climb rate.

This is illustrated in FIGS. 13 and 14, which both describe an obstacle 1300 and 1400 over which an aircraft is to fly. In FIG. 13, it is assumed that the obstacle is a local maximum, such as a mountain peak, and that the aircraft starts a descent directly after the obstacle, thus directly behind the actual node $\omega$. This results in the correction of the flight altitudes of the preceding nodes, particularly of node v, assuming a "push arc". This results in flight path 1301 of the aircraft. If it is later found that the node $\omega$ was no local maximum and the aircraft has to continue climbing in order to reach the node $\bar{\omega}$ that follows, then flight path 1302 would have been the correct flight path. Theoretically, this could then be taken into account when computing the corrected costs of node $\bar{\omega}$.

On the other hand, FIG. 14 shows a case in which a further climb of the aircraft to node $\bar{\omega}$ is at first assumed in node $\omega$. Consequently, in this case, the corrected costs of the nodes disposed in front of node $\omega$ (in particular, node v), are computed with the flight path 1401. If it is now determined afterwards that the actual node $\bar{\omega}$ was a local maximum, the correct flight path would have been a "push arc" flight path 1402.

As illustrated in FIGS. 13 and 14, the assumption of a "push arc" flight path leads to greater altitudes than the assumption of a flight path with a constant climb rate. In the case of costs which rise with an increasing altitude, it follows therefrom that the assumption of a "push arc" flight path has the tendency to result in higher corrected costs than the assumption of a flight path with a constant climb rate. Finally, it should be noted that a "push arc" flight path can be considered to be a flight path with a variable climb and descent rate.

Figure 15:
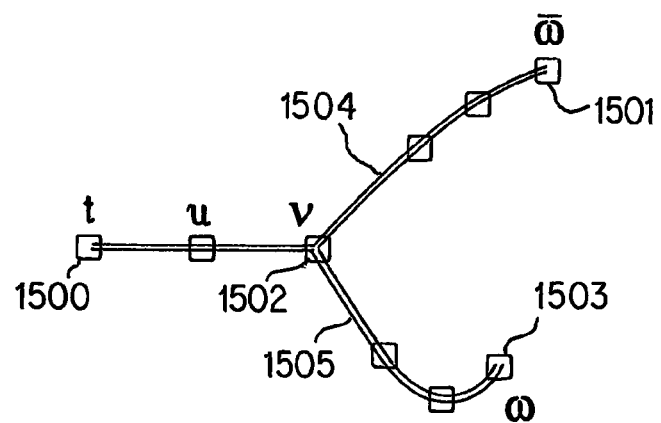
FIG. 15 is a top view of two partially identically extending flight routes.

In the following, reference is made to FIG. 15 which is a top view of two flight routes 1504 and 1505. Flight route 1504 leads from raster point 1500 to raster point 1501; flight route 1505 leads from raster point 1500 to raster point 1503. Both flight routes 1504 and 1505 extend to raster point 1502 by way of the same raster points and branch out from this raster point 1502. If an altitude conflict situation is now determined in raster point 1503, by way of the described "backward" process, corrected flight altitudes and costs could then be determined for the preceding raster points. These corrected costs and flight altitudes could also be stored in connection with the preceding nodes. However, this could lead to conflict situations, particularly in node 1502, which is part of flight route 1504 as well as of flight route 1505. It is definitely conceivable that the altitude conflict situation on flight route 1505 may demand a correction of the altitude and costs for node 1502. On the other hand, the original altitude for flight route 1504 may be correct. As a result, although in a preferred embodiment the cumulative costs for a current node, i.e., node 1503, are corrected, the costs of the preceding nodes, i.e., node 1502, are not.

Table 6 (below) shows the "backward" process in pseudocode.

The illustrated algorithm describes how the corrected costs on the transition between two nodes v and w can be computed. In this case, "from" represents the preceding node and "to" represents the current node. The functions sin(angle), sin(climb) and sin(descent) represent the climb rates of the aircraft in various flight situations. The function "length(v, w)" determines the distance between two nodes v and w, thus, the length of the transition between the two nodes. The "terrain (v)" function represents the topographical height of a node point v which, for the purpose of simplification, was equated here with the minimal flight altitude above the ground.

TABLE 6

| 1 | function isClimbOk(from, to, angle) |
| 2 | |
| 3 | deltaHeight := causal(to) − causal (from) |
| 4 | capable Climb := length (from, to) * sin (angle) |
| 5 | return (deltaHeight <= capableClimb) |
| 6 | end function |
| 7 | |
| 8 | function flyOnEdge (v,w) |
| 9 | |
| 10 | if causal (w) > causal (v) |
| 11 | /* check that the aircraft can climb */ |
| 12 | ifisClimbOk (v, w, climb) |
| 13 | causalTmp := terrain (w) |
| 14 | back := causal (v) |
| 15 | costTmp := 0 |
| 16 | else |

TABLE 6-continued

| 17 | causalTmp := terrain (w) |
| 18 | back := terrain (w) − |
| 19 | length (v, w) * sin(climb) |
| 20 | costTmp := backwardComputation (v, back) |
| 21 | else |
| 22 | /* check that the aircraft can descent */ |
| 23 | if isClimbOk (w, v, descent) |
| 24 | causalTmp := terrain (w) |
| 25 | Back := causal (v) |
| 26 | costTmp := 0 |
| 27 | else |
| 28 | causalTmp := causal (v) + |
| 29 | length (v,w) * sin(descent) |
| 30 | back := terrain (v) |
| 31 | costTmp := 0 |
| 32 | |
| 33 | costTmp := costTmp + cost(v, w, back, causalTmp) |
| 34 | |
| 35 | if costTmp + cost (v) < cost (w) |
| 36 | cost (w) := costTmp + cost (v) |
| 37 | causal (w) := causalTmp |
| 38 | pred (w) := v |
| 39 | end function |

In other words, the described "backward" process takes into account the fact that missiles have limited climbing capacities. For this reason, a missile cannot fly over any arbitrary obstacle but has to start a climb in advance. Such an advance consideration into the future is basically not known in the route planning from the prior art. This means that, by means of route planners from the state of the art, it is not possible to plan when the missile should climb in advance in order to fly over an obstacle situated in the future. Theoretically, it would therefore make sense to start increasing the flight altitude at each node. As a result, several reachable altitudes would then be indicated for each node or for each raster point; i.e., the topographical height of the raster point, the flight altitude if the missile were to start climbing one step in advance, the flight altitude if the missile were to start climbing two steps in advance, etc.

De facto, this additional consideration of the altitude would then correspond to a further condition of the optimization space, which has a very bad influence on the computing time and on the storage consumption of the shortest path algorithms. On the other hand, the altitude problems can also not be ignored because they have an effect on the costs of the selected routes since the costs of the routes are a function of the flight altitude of the aircraft.

The described "backward" process makes it possible to solve the altitude problem without considering the height as a condition of the search space. On the one hand, a classical shortest path algorithm, such as the Dijkstra Search is used for this purpose, which is described in Dijkstra, E. W. "A Note on Two Problems in Connexion with Graphs." Numerical Mathematics, 1:269-271, 1959. Accordingly, the missile will attempt at each point to assume a cost-optimal flight altitude. In the case of military threats, this is normally low-level flying at the lowest possible flight altitude. In the case of such a low-level flight, a differentiation can be made between four cases:

a) The terrain drops off steeper than the maximal angle of descent of the air vehicle. The altitude of the missile will then be limited by its descent dynamics;

b) the terrain drops off but is flatter than the maximal angle of descent of the air vehicle. The altitude of the missile can then be defined as the minimal flight altitude above the terrain;

c) the terrain rises but is flatter than the maximal climb angle of the missile. The altitude of the missile can then be defined as the minimal flight altitude above the terrain;

d) the terrain rises more than the maximal angle of climb of the missile. In this case, an altitude problem occurs which can be solved by means of the described "backward" process.

As explained above in a different fashion, the "backward" process consists of the fact that, on the horizontal route for which an altitude problem was detected, a backward computation takes place as to when the missile would have had to begin the climb in order to be able to fly over the current obstacle. This computation will then also determine what the correct costs of the route were at the point of the obstacle, so that the costs can be corrected in the course of the search. This aspect also ensures the correctness of the costs of the planned routes.

It should also be noted that, because of such an abrupt change of altitude, the flight altitudes of a missile at preceding nodes computed during the standard Dijkstra search may possibly be wrong. The above-explained reason is that these flight altitudes computed by way of a standard Dijkstra search can take into account only the preceding obstacles but not the coming obstacles. However, in a preferred embodiment, these determined altitudes at preceding nodes are not changed even if flight altitudes were determined that were corrected by way of the "backward" process. The reason is that the originally determined altitudes could definitely be correct for a further route extending by way of the node.

Figure 16:
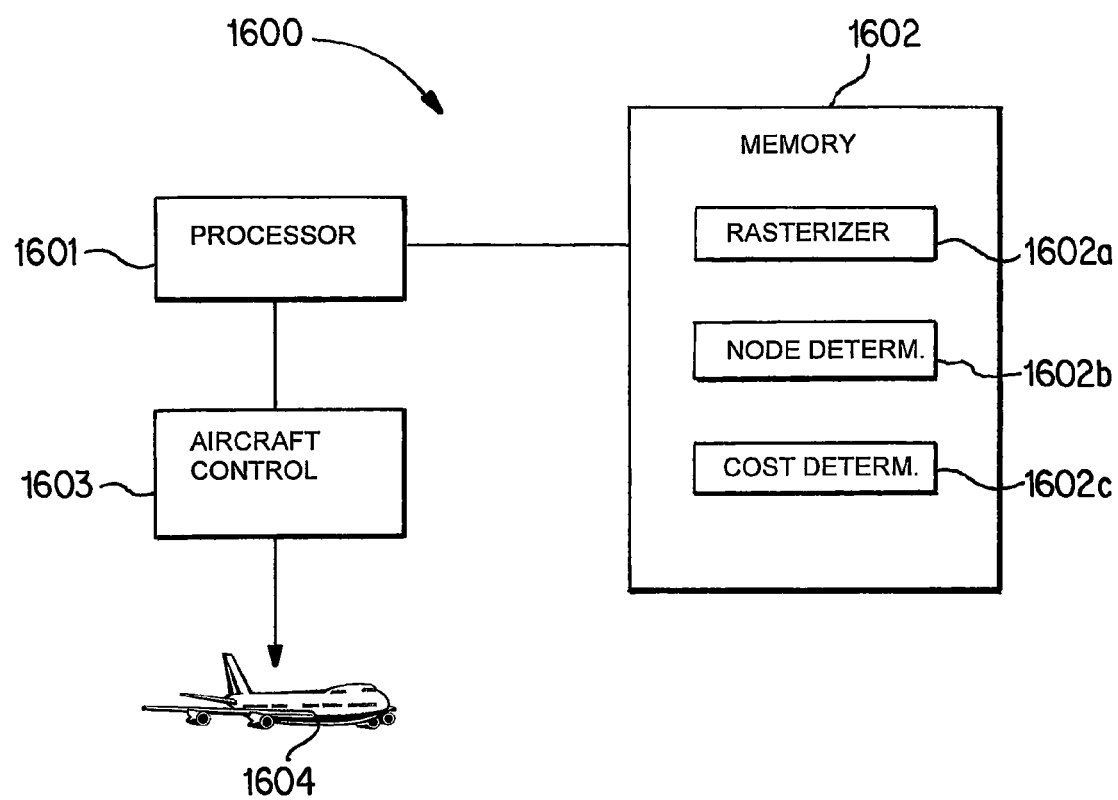
FIG. 16 is a schematic depiction of a system for performing the method according to the invention.

As shown in FIG. 16, the invention further comprises a system 1600 for determining a cost-minimized flight route for aircraft between a starting point and an end point, taking into account costs associated with the flight route and limitations of the flight route causes by the aircraft. The system comprises a computing device 1601 for determining the raster set (1602*a*) which comprises possible topographical points between the starting point and the end point, determining costs (1602*c*) associated with the raster points of the raster set, and determining N nodes (1602*b*) to each raster point of at least one subset of the raster set. The N nodes are associated with approach directions to the raster point by the aircraft. In addition, as a function of the approach direction, possible take-off directions of the raster point are defined, the possible take-off directions being defined while taking into account the turning radius of the aircraft. Finally, the computing device 1601 also determines a cost-minimized flight route between a starting point and an end point by means of a shortest path algorithm, only the k most cost-effective nodes being taken into account for a raster point and k being smaller than N, as described herein.

According to a further aspect, the invention also comprises a flight control system for aircraft, as well as an onboard computer of a manned or unmanned air vehicle, which carries out the described process. Such an onboard computer typically has a memory 1602, in which the described process is stored, and a processor 1601, which carries out the described process steps. Thus, it is conceivable that, based on the determined flight route, an automatic or manual intervention 1603 takes place into the control of the air vehicle 1604. Particularly in the case of unmanned air vehicles, such as drones or missiles, new knowledge concerning threat risks could thus be taken into account close to real time in the flight control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

101—Aircraft;
102, 107—Turning circles of the aircraft
103—Minimal turning circle of the aircraft
104, 106—Raster points over which the flight of the turning circles 102, 107 took place
105—Raster point
200—Turning circle of an aircraft
201—Angle segment
202—Circle segment
301, 302—Transitions between raster points
401, 402—Turning circles modeled with transitions
501—Raster points
502, 512, 522—Approach directions
503, 504, 505, 513, 514, 515, 523, 524, 525—Take-off directions
601—Flight obstacle
602—Static climb
603—Static descent
604—Dynamic climb
605—Dynamic descent
701, 702, 703—Parallel extending routes
704, 705, 706—Combined parallel extending routes
801—Improbable take-off directions at the starting point
802—Improbable take-off directions at the end point
901, 902—Fixed direction patterns
903—Adjacent fixed direction pattern
1001—Best route
1002—A route which crosses the best route
1101, 1111—Transitions
1102, 1103, 1104, 1117, 1112—Raster points over which the flight takes place during the transition
1113, 1114, 1115, 1116, 1118, 1119, 1120, 1121—Raster points adjacent to the transition
1200—Topographical region
1201, 1209, 1210, 1211, 1212, 1213—Preceding raster points
1202—Current raster point
1203—Original flight path
1204—Descent angle of the aircraft
1205—Climb angle of the aircraft
1206—Corrected flight path of the aircraft
1207—Next raster point
1208—Flight altitude of the aircraft above the topographical height
1300—Obstacle
1301—"Push arc" flight path
1302—Flight path with constant climb rate
1400—Obstacle
1401—Flight path with a constant climb rate
1402—"Push arc" flight path
1504, 1505—Flight routes
1500, 1501, 1502, 1503—Raster points

What is claimed is:

1. A process for determining a cost-minimized flight route for an aircraft between a starting point and an end point, taking into account costs associated with the flight route and limitations of the flight route caused by the aircraft, the process comprising:

determining, by a processor, a raster set which comprises topographical raster points between the starting point and the end point;

determining, by the processor, costs associated with respective raster points of the raster set;

determining, by the processor, N nodes for each raster point of at least one subset of the raster set; wherein
i) the N nodes are associated with approach directions of the aircraft to the raster point;
ii) possible take-off directions of the raster point are determined as a function of the approach directions; and iii) said possible take-off directions are defined taking into account a turning radius of the aircraft; and determining, by the processor, the cost-minimized flight route between the starting point and the end point by means of a shortest path algorithm; wherein x) for a particular raster point, only k most cost-effective nodes are taken into account; and y) k≥3 and k is less than N.

2. The process according to claim 1, wherein a raster point is defined by geographic area coordinates and topological altitude of a point on the earth's surface.

3. The process according to claim 1, wherein the costs take into account a threat risk of the aircraft.

4. The process according to claim 3, wherein the threat risk takes into account at least one of:

a line of sight starting from a raster point;
presence of surface-to-air missiles;
presence of radar stations;
"no-fly" zones; and
flight corridors.

5. The process according to claim 1, wherein the costs take into account flight altitude of the aircraft.

6. The process according to claim 5, wherein a minimal flight altitude possible at a topographical height of a raster point is taken into account for computing the costs.

7. The process according to claim 5, wherein a minimal flight altitude possible at the topographical height of a raster point and a possible rate of descent of the aircraft are taken into account for computing the costs.

8. The process according to claim 1, wherein a number of raster points in the raster set depends on a minimum turning radius of the aircraft.

9. The process according to claim 1, wherein:

each of the N nodes defines an approach direction of the raster point by the aircraft; and the N approach directions are uniformly distributed on a circle.

10. The process according to claim 1, wherein said possible take-off directions define a transition from a current raster point to a raster point that follows.

11. The process according to claim 10, wherein costs of the transition depend on costs of the raster points adjoining the transition, and on a time in which the aircraft flies through the transition.

12. The process according to claim 10, wherein the nodes associated with the raster points, the transitions between these nodes and the costs of the transitions define a weighted graph.

13. The process according to claim 1, wherein only geographical coordinates of a raster point and the raster point's associated approach directions, but not the flight altitude of the aircraft, define nodes for determination of the cost-minimized flight route by means of the shortest path algorithm.

14. The process according to claim 1, wherein three possible take-off directions are defined for the nodes, including a straight-line take-off direction, a take-off direction extending leftward and a take-off direction extending rightward.

15. The process according to claim 1, wherein N is equal to 16 and k is equal to 3.

16. The process according to claim 1, wherein the shortest path algorithm is one of a Dijkstra algorithm, an A* algorithm, and a Bellmann-Ford algorithm.

17. An onboard computer of an aircraft which implements the process according to claim 1.

18. A system for determining a cost-minimized flight route for an aircraft between a starting point and an end point, taking into account costs associated with the flight route and limitations of the flight route caused by the aircraft, the system comprising:

computation means for determining a raster set which comprises topographical raster points between the starting point and the end point;

computation means for determining costs associated with respective raster points of the raster set;

computation means for determining N nodes to each raster point of at least one subset of the raster set; wherein i) the N nodes are associated with approach directions of the aircraft to the raster point;

ii) possible take-off directions of the raster point are determined as a function of the approach directions; and iii) said possible take-off directions are defined, taking into account a turning radius of the aircraft; and computation means for determining the cost-minimized flight route between the starting point and the end point by means of a shortest path algorithm; wherein x) for a particular raster point, only k most cost-effective nodes are taken into account; and y) k≥3 and k is less than N.

19. An air control system for aircraft which comprises the system according to claim 18.

* * * * *